US012662947B2

(12) United States Patent　　(10) Patent No.:　US 12,662,947 B2
Colson et al.　　　　　　　　　　(45) Date of Patent:　Jun. 23, 2026

(54) FLEXIBLE INTERFACE COUPLING

(71) Applicant: Hamilton Sundstrand Corporation, Charlotte, NC (US)

(72) Inventors: Darryl Colson, West Suffield, CT (US); Frederick Peacos, III, North Scituate, RI (US); Kara Ann Grant, Southampton, MA (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/401,910

(22) Filed: Jan. 2, 2024

(65) Prior Publication Data

US 2025/0215808 A1　　Jul. 3, 2025

(51) Int. Cl.
　　*F01D 25/04*　　(2006.01)
　　*F01D 25/24*　　(2006.01)
　　*F02C 7/18*　　(2006.01)

(52) U.S. Cl.
　　CPC ........... *F01D 25/04* (2013.01); *F01D 25/243* (2013.01); *F02C 7/185* (2013.01); *F05D 2240/55* (2013.01); *F05D 2260/213* (2013.01); *F05D 2260/38* (2013.01); *F05D 2260/96* (2013.01)

(58) Field of Classification Search
　　CPC ............. F01D 25/04; F02C 6/08; F02C 7/185
　　See application file for complete search history.

(56) References Cited

U.S. PATENT DOCUMENTS

| 6,434,968 B2 | 8/2002 | Buchholz et al. |
| 7,779,644 B2 | 8/2010 | Decrisantis et al. |
| 8,333,549 B2 | 12/2012 | Nims |
| 10,487,853 B2 | 11/2019 | Beers et al. |
| 11,828,191 B2 * | 11/2023 | Joly .......................... F01D 5/10 |
| 2007/0130912 A1 | 6/2007 | Kraft et al. |
| 2012/0216506 A1 | 8/2012 | Eleftheriou et al. |
| 2013/0344790 A1 | 12/2013 | Army et al. |
| 2018/0202591 A1 | 7/2018 | Tajiri et al. |
| 2024/0426222 A1 * | 12/2024 | Trivedi ................... F01D 25/04 |

FOREIGN PATENT DOCUMENTS

| CN | 114080490 A * | 2/2022 | ............. F01D 25/06 |

OTHER PUBLICATIONS

Extended European Search Report for EP Application No. 24223858. 2; Issue date, Apr. 28, 2025, 12 pages.

* cited by examiner

*Primary Examiner* — Courtney D Heinle
*Assistant Examiner* — John S Hunter, Jr.
(74) *Attorney, Agent, or Firm* — CANTOR COLBURN LLP

(57)　　　　　　ABSTRACT

An air cycle system for a gas turbine engine includes a heat exchanger having an air cycle inlet. An air cycle machine includes an air cycle machine outlet and an annular flexible interface coupling connecting the air cycle inlet to the outlet. The flexible interface coupling includes a receiving portion having a flared region across which a diameter of a heat exchanger portion increases and a landing portion across which the diameter of the heat exchanger portion is maintained. An air cycle machine portion is received in the receiving portion and includes an outlet flange and a diffuser radially inward of the outlet flange. The outlet flange includes a radially outward facing surface contacting a radially inward facing surface of the landing portion. The diffuser is configured to move axially and radially relative to the outlet flange.

18 Claims, 5 Drawing Sheets

FLEXIBLE INTERFACE COUPLING

BACKGROUND

Exemplary embodiments pertain to the art of flexible interface couplings for air cycle machines (ACMs), and more particularly to a vibration reducing configuration for coupling an ACM to a rigidly mounted heat exchanger.

Due to their rotational nature, aircraft engines and auxiliary power units vibrate during operation. When a heat exchanger is rigidly mounted to, or incorporated in, an engine, vibrations from the engine are passed into the heat exchanger through the rigid mounts.

Similarly, ACMs incorporate rotating machines and can generate their own vibrations. When the vibrations from both the ACM and the heat exchanger are combined together via vibrational transfer from the ACM to the heat exchanger, amplification of the vibrations within the heat exchanger can result. This amplification can drive the vibrations to exceed acceptable vibrational loads.

BRIEF DESCRIPTION

Disclosed is an air cycle system for a gas turbine engine includes a heat exchanger including an air cycle inlet, an air cycle machine including an air cycle machine outlet, and an annular flexible interface coupling connecting the air cycle inlet to the outlet, wherein the flexible interface coupling includes a receiving portion having a flared region across which a diameter of a heat exchanger portion increases and a landing portion across which the diameter of the heat exchanger portion is maintained, and an air cycle machine portion received in the receiving portion and including an outlet flange and a diffuser radially inward of the outlet flange, the outlet flange including a radially outward facing surface contacting a radially inward facing surface of the landing portion, and wherein the diffuser is configured to move axially and radially relative to the outlet flange.

In a further example of the above, the air cycle machine is vibrationally isolated from the heat exchanger via the flexible interface coupling.

In a further example of any of the above, the radially outward facing surface of the outlet flange includes at least one spring energized seal.

In a further example of any of the above, the air cycle system includes a plurality of spring energized seals configured to allow the diffuser to move axially and radially relative to the outlet flange, and wherein the at least one spring energized seal is a subset of the plurality of spring energized seals.

In a further example of any of the above, the outlet flange is connected to the air cycle machine via a retaining plate.

In a further example of any of the above, the retaining plate is affixed to the outlet flange via at least one fastener.

In a further example of any of the above, an axial end of the diffuser is at a first axial position while the air cycle system is in an off state, relative to a centerline axis of the annular flexible interface coupling, and wherein an axial end of the retaining flange is at the first axial position while the air cycle system is in the off state.

In a further example of any of the above, the axial end of the diffuser is radially inward of the axial end of the retaining flange by at least a first radius while the air cycle system is in the off state.

In a further example of any of the above, a wall defining the flared region and the landing portion includes at least one cavity.

In a further example of any of the above, the at least one cavity is configured to receive a heated fluid while the air cycle system is operational.

In a further example of any of the above, the heat exchanger is rigidly mounted to an aircraft engine.

In a further example of any of the above, the air cycle machine is a rotating machine including at least one of a compressor and a turbine.

In a further example of any of the above, at least one of an interior surface of the receiving portion and an exterior surface of the retaining flange includes a low friction coating.

In a further example of any of the above, the low friction coating is a polytetrafluoroethylene coating.

Also disclosed is a method for reducing vibrational transfer between a heat exchanger and an air cycle machine, the method includes connecting a fluid inlet of the heat exchanger to a fluid outlet of the air cycle machine using a flexible inlet coupler, the flexible inlet coupler being configured to vibrationally isolate the air cycle machine from the heat exchanger by allowing a diffuser of the air cycle machine to move axially and radially relative to a centerline axis of the flexible inlet coupler.

In a further example of any of the above, the flexible inlet coupler includes a receiving portion having a flared region across which a diameter of the heat exchanger portion increases and a landing portion across which the diameter of the heat exchanger portion is maintained, and an air cycle machine portion received in the receiving portion and including an outlet flange and a diffuser radially inward of the outlet flange, the outlet flange including a radially outward facing surface contacting a radially inward facing surface of the landing portion.

In a further example of any of the above, the method further includes comprising maintaining a temperature of the flexible inlet coupling above freezing temperatures by providing a heated fluid from the heat exchanger into at least one cavity defined within a wall defining the receiving portion.

In a further example of any of the above, an axial end of the diffuser is at a first axial position while the air cycle system is in an off state, relative to a centerline axis of the annular flexible interface coupling, and wherein an axial end of the retaining flange is at the first axial position while the air cycle system is in the off state.

In a further example of any of the above, the axial end of the diffuser is radially inward of the axial end of the retaining flange by at least a first radius while the air cycle system is in the off state.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As noted above, reducing vibration may be needed in some cases to prevent the ACM from increasing vibration in the heat exchanger. Existing vibrational isolation systems can include gapping or openings that expose components within the ACM to subfreezing operating temperatures. This in turn can cause icing to occur internal to the ACM.

Accordingly, to address such vibration without the above shortcoming, embodiments herein may provide for an ACM to be isolated relative to a rigidly fixed heat exchanger by ensuring that a fluid connection between the ACM and the heat exchanger is capable of accommodating assembly tolerances and vibration deflections while also minimizing internal icing risk resulting from subfreezing operating temperatures.

Aircraft typically include multiple environmental systems that utilize pressurized and conditioned air drawn from sources within an engine and/or ambient air sources during a flight. The systems that utilize the air can be referred to as "Air Cycle Machines" (ACMs) and can provide distinct functions. In some cases, such as for an environmental ACM, the air is also conditioned by passing the air through a heat exchanger after it is passed through the ACM. It should be understood that the particular functions and internal operations of the ACMs and heat exchanger described herein are exemplary in nature, and not limiting. Practical ACMs can include any configuration of compressors, turbines, or other rotating components utilizing the air.

Figure 1:
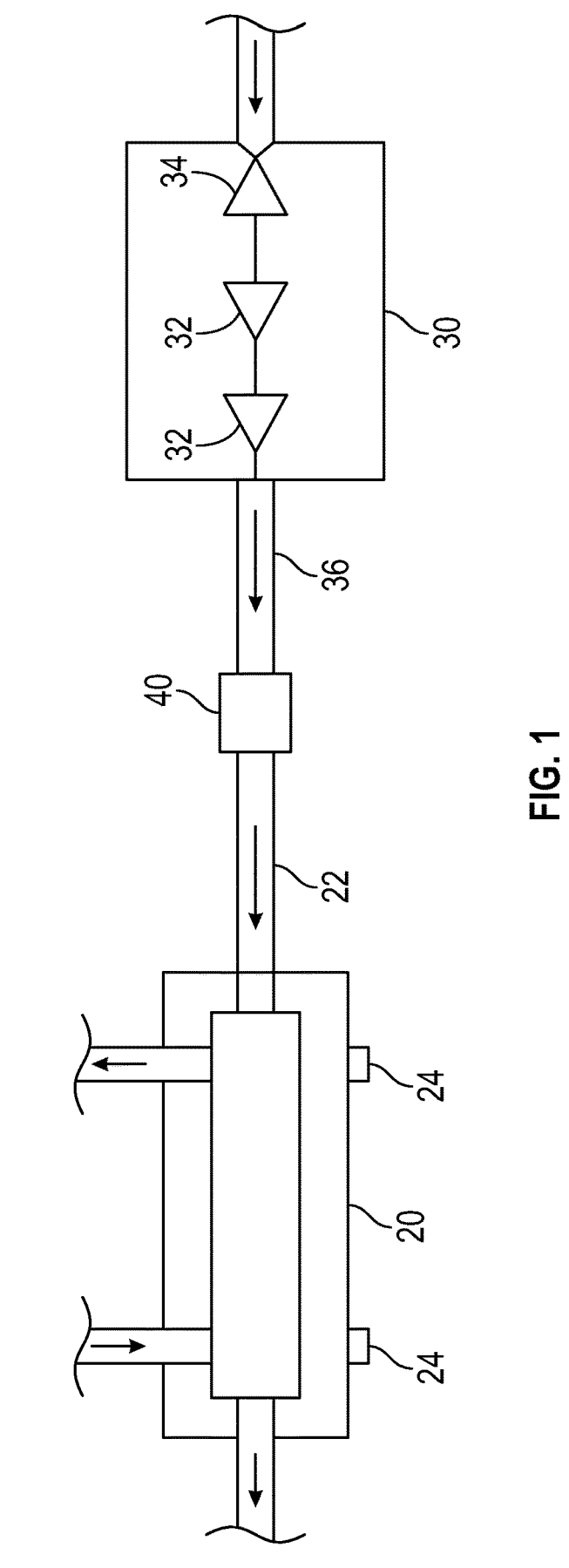
FIG. 1 is a partial schematic of an aircraft air cycle.

FIG. 1 illustrates a partial view of an air cycle system 10 including a heat exchanger 20 receiving air from an air cycle machine (ACM) 30 via conduits 22, 36. The conduits 22, 36 are joined via a flexible interface coupling 40 constructed according to the features described herein, and illustrated in detail within FIGS. 2-4. The heat exchanger 20 is mounted to an aircraft structure via support 24. The mounting is rigid in nature, and vibrations of the aircraft structure are passed through the supports into the heat exchanger 20. For example, the engine may generate vibrations and these may be transferred via the supports 24 into the heat exchanger 20. The ACM 30 is vibrationally isolated from the aircraft structure in order to minimize structural loads on the ACM 30.

The ACM 30 includes compressor 34 and turbines 32. The rotation of compressor 34 and turbines 32 generate vibrations within the ACM 30 while the ACM 30 is operating.

In certain cases, it is desirable to minimize, or avoid entirely, transmission of vibrations between the heat exchanger 20 and the ACM 30. In order to achieve this goal, the flexible interface coupling 40 allows radial movement of the ACM 30 conduit 36 relative to a centerline axis C of the flexible interface coupling 40 within a receiving portion of the heat exchanger conduit 22. In addition, the flexible interface coupling 40 utilizes low friction coatings and seals that are shielded from subfreezing airflow, thereby minimizing any drag associated with the required radial motion. In some examples, heated fluid can be provided through cavities in the receiving portion of the heat exchanger conduit 22 to further minimize subfreezing conditions.

Figure 2:
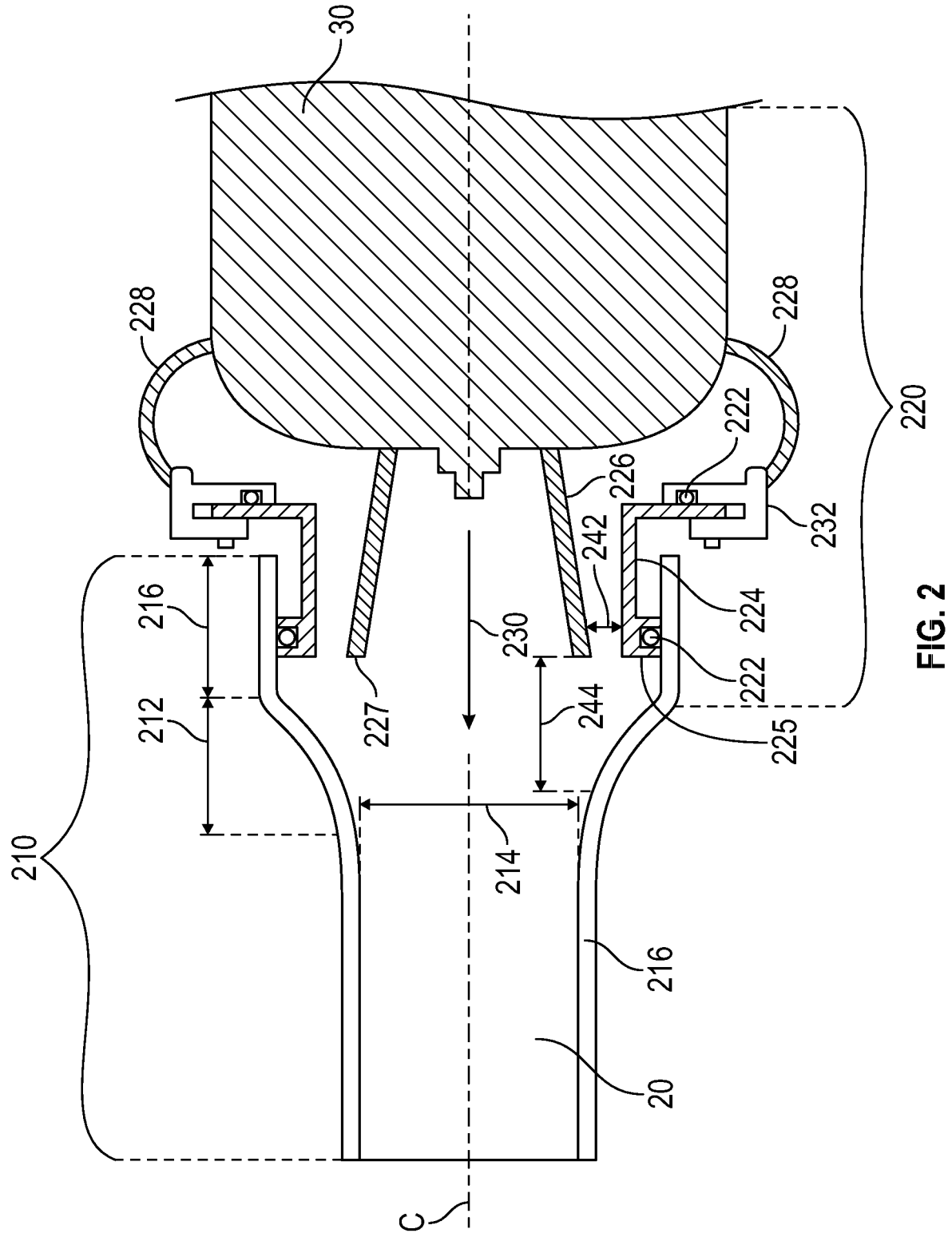
FIG. 2 is a cross sectional view of a flexible interface coupling embodiment for use in the air cycle of FIG. 1.
Figure 3:
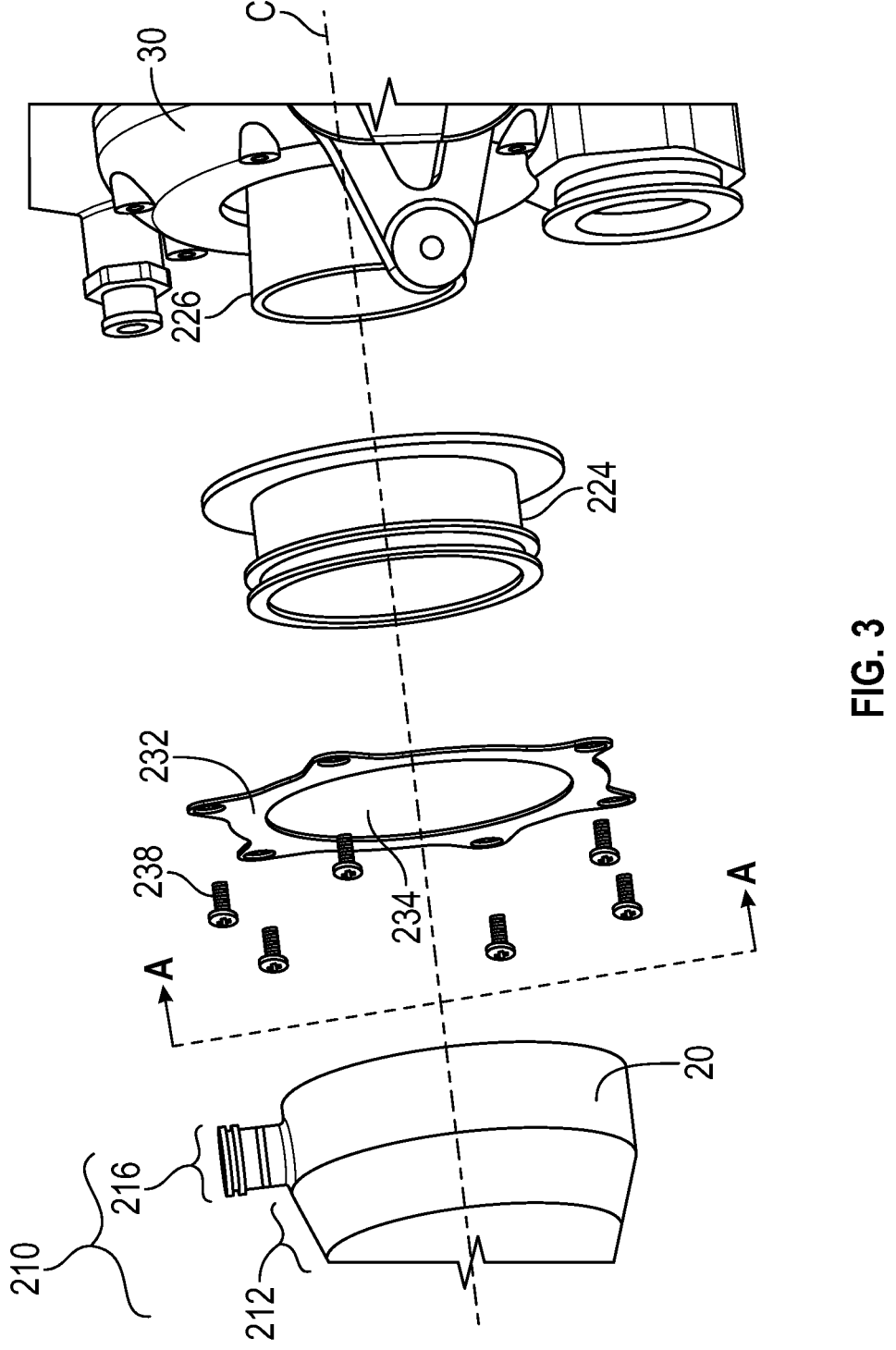
FIG. 3 is an exploded isometric view of the flexible interface coupling of FIG. 2.
Figure 4:
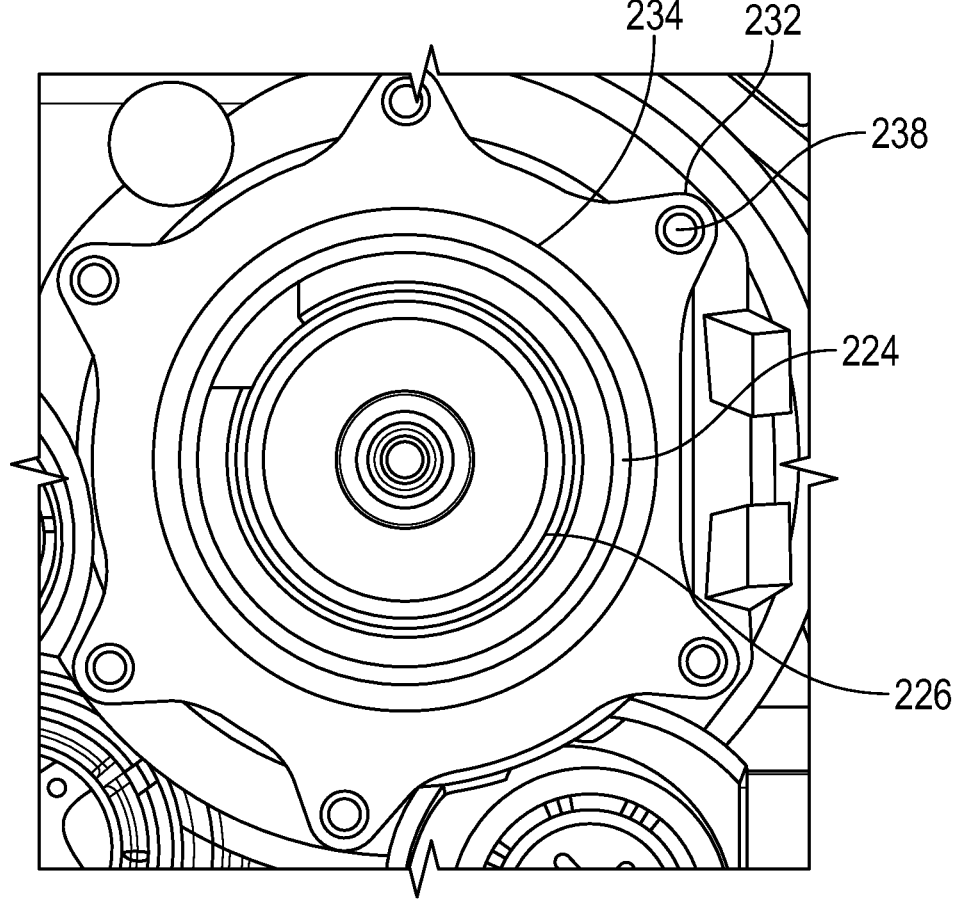
FIG. 4 is an end view of an air cycle machine portion of the flexible interface coupling of FIG. 2 along a view line A-A.

FIGS. 2-4 illustrate an example flexible interface coupling 40 according to this general construction in more detail, with FIG. 2 illustrating a cross section of the flexible interface coupling 40, FIG. 3 illustrating an exploded isometric view of the flexible interface coupling 40, and FIG. 4 illustrating an end view of an ACM 30 portion of the flexible interface coupling 40.

The flexible interface coupling 40 is an annular structure defining a centerline axis C. The coupling 40 includes a heat exchanger portion 210 connected to the heat exchanger 20. The coupling 40 also includes an ACM portion 220 connected to the ACM 30. The heat exchanger portion 210 includes a flared region 212 across which an internal diameter 214 of the receiving portion 210 increases. A landing portion 216 extends from an end of the flared portion 212 and makes contact with one or more seals 222 and an outlet flange 224 of the ACM 30.

The receiving portion 210, including the flared portion 212 and at least part of the landing portion 214 defines cavities 216 through which heated air, or another heated fluid, is passed. The heated fluid maintains temperatures with the flexible interface coupling 40 at above freezing temperatures.

Radially inward of the outlet flange 224 and also connected to the ACM 30 is a diffuser 226. During operation the diffuser 226 diffuses an airflow 230 into the flared region 212, and the airflow 230 is received by the heat exchanger 20.

The outlet flange 224 is connected to the ACM 30 turbine housing 228 via a retaining plate 232. The retaining plate 232 is generally ring shaped, with the diffuser 226 and the outlet flanges 224 protruding through a center opening 234 of the retaining plate 232. In order to maintain a close tolerance fit between the ACM turbine rotor and the shroud to maximize turbine cooling performance, the diffuser 226 is rigidly attached to the ACM 30 turbine shroud. The retaining plate 232 is maintained in position via a set of fasteners 238 distributed around a circumference of the retaining plate 232. Barring additional features of the ACM 30 requiring modification to the distribution, the fasteners 238 are distributed evenly about the circumference of the retaining plate 232.

The joints 228 allow the ACM 30 to move radially and axially relative to the outlet flange 224 and the receiving portion 210. Vibrations within the heat exchanger 20 are passed into the outlet flange 224, and isolated from turbine housing 228.

To accommodate the vibrations in each of the heat exchanger 20 and the ACM 30, the diffuser 226 has a radial clearance 242 relative to the outlet flange 224 and an axial clearance relative to an inner wall of the flared region 212. While the system is at rest (e.g. the aircraft has the engines off and is parked), no vibrations are present, and an axial end 227 of the diffuser section 226 is at the same axial position as an axial end 225 of the flange 224. While the system is operational (e.g. the aircraft engines are operating) vibrations cause the heat exchanger 20 to move both axially and radially, relative to the centerline axis C. The axial clearance 244 and the radial clearance 242 between the diffuser 226 and the outlet flange 224 allows the interface coupling 40 to maintain a fluid connection while also allowing the movement of the heat exchanger 20 to not be translated to the ACM 30.

In one specific example, the radial clearance 242 is approximately 0.375 inches (0.9525 CM) plus or minus a manufacturing tolerance. Similarly, in one specific example, the axial clearance 244 is 0.375 inches (0.9525 CM) plus or minus a manufacturing tolerance.

In order to reduce friction, the interior surfaces of the flared region 212 and the landing portion 216, as well as exterior surfaces of the outlet flange 224 are coated with low friction coatings. In one example, the low friction coating is a polytetrafluoroethylene coating. In alternate examples, alternative low friction materials may be used to similar effect.

Figure 5B:
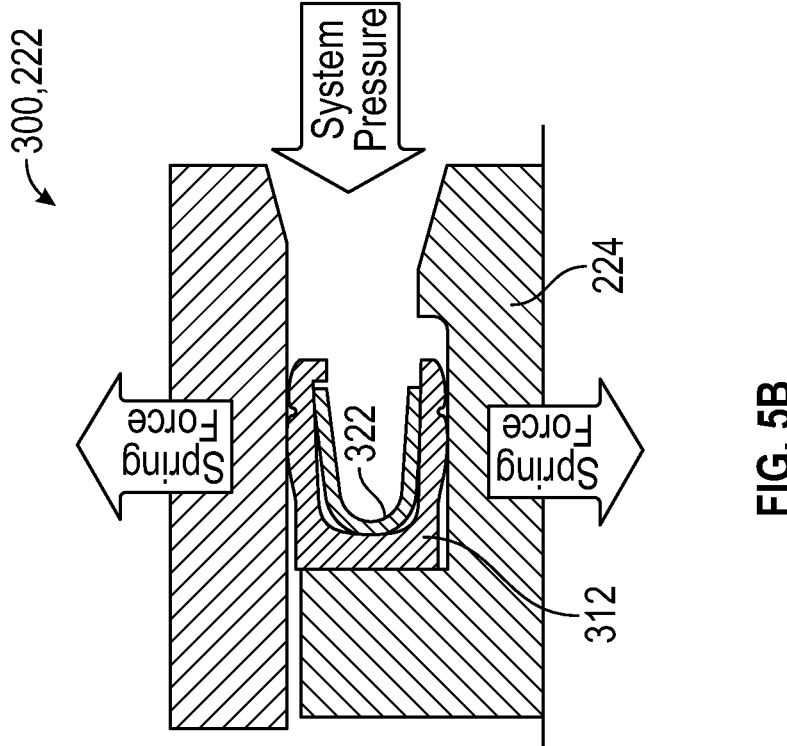
FIG. 5B illustrates a second example spring seal for use in the flexible interface coupling of FIG. 2.
Figure 5A:
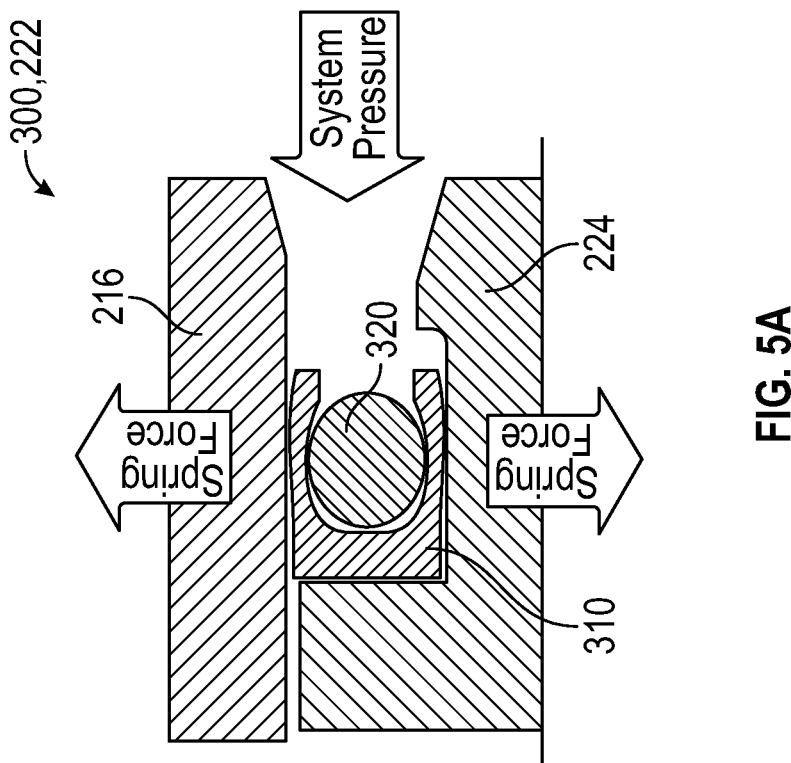
FIG. 5A illustrates a first example spring seal for use in the flexible interface coupling of FIG. 2.

In one example, the seals 222 are low friction spring energized seals 300. FIGS. 5A and 5B illustrate exemplary spring energized seals 300. In each example, a seal element 310, 312 constructed of a polymer such as polytetrafluoroethylene or any similar material is disposed around a corrosion resistant metal spring 320, 322. The corrosion resistant metal spring 320, 322 forces the seal element against the inner surface of the landing portion 216 and against the retaining flange 224. The seal creates a tight barrier that prevents gas or fluids from leaking. The spring also provides resiliency to compensate for seal wear, potential installation misalignment and/or manufacturing tolerances. The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle system for a gas turbine engine comprising:

a heat exchanger including an air cycle inlet;

an air cycle machine including an air cycle machine outlet; and an annular flexible interface coupling connecting the air cycle inlet to the outlet, wherein the flexible interface coupling includes:

a receiving portion having a flared region across which a diameter of a heat exchanger portion increases and a landing portion across which the diameter of the heat exchanger portion is maintained, and an air cycle machine portion received in the receiving portion and including an outlet flange and a diffuser radially inward of the outlet flange, the outlet flange including a radially outward facing surface contacting a radially inward facing surface of the landing portion, and wherein the diffuser is configured to move axially and radially relative to the outlet flange.

2. The air cycle system of claim 1, wherein the air cycle machine is vibrationally isolated from the heat exchanger via the flexible interface coupling.

3. The air cycle system of claim 1, wherein the radially outward facing surface of the outlet flange includes at least one spring energized seal.

4. The air cycle system of claim 3, wherein the air cycle system includes a plurality of spring energized seals configured to allow the diffuser to move axially and radially relative to the outlet flange, and wherein the at least one spring energized seal is a subset of the plurality of spring energized seals.

5. The air cycle system of claim 1, wherein the outlet flange is connected to the air cycle machine via a retaining plate.

6. The air cycle system of claim 5, wherein the retaining plate is affixed to the outlet flange via at least one fastener.

7. The air cycle system of claim 1, wherein an axial end of the diffuser is at a first axial position while the air cycle system is in an off state, relative to a centerline axis of the annular flexible interface coupling, and wherein an axial end of the outlet flange is at the first axial position while the air cycle system is in the off state.

8. The air cycle system of claim 7, wherein the axial end of the diffuser is radially inward of the axial end of the outlet flange by at least a first radius while the air cycle system is in the off state.

9. The air cycle system of claim 1, wherein a wall defining the flared region and the landing portion includes at least one cavity.

10. The air cycle system of claim 9, wherein the at least one cavity is configured to receive a heated fluid while the air cycle system is operational.

11. The air cycle system of claim 1, wherein the heat exchanger is rigidly mounted to an aircraft engine.

12. The air cycle system of claim 11, wherein the air cycle machine is a rotating machine including at least one of a compressor and a turbine.

13. The air cycle system of claim 1, wherein at least one of an interior surface of the receiving portion and an exterior surface of the outlet flange includes a low friction coating.

14. The air cycle system of claim 13, wherein the low friction coating is a polytetrafluoroethylene coating.

15. A method for reducing vibrational transfer between a heat exchanger and an air cycle machine, the method comprising:

connecting a fluid inlet of the heat exchanger to a fluid outlet of the air cycle machine using a flexible inlet coupler, the flexible inlet coupler being configured to vibrationally isolate the air cycle machine from the heat exchanger by allowing a diffuser of the air cycle machine to move axially and radially relative to a centerline axis of the flexible inlet coupler, wherein the flexible inlet coupler includes a receiving portion having a flared region across which a diameter of the heat exchanger portion increases and a landing portion across which the diameter of the heat exchanger portion is maintained, and an air cycle machine portion received in the receiving portion and including an outlet flange and a diffuser radially inward of the outlet flange, the outlet flange including a radially outward facing surface contacting a radially inward facing surface of the landing portion.

16. The method of claim 15, further comprising maintaining a temperature of the flexible inlet coupling above freezing temperatures by providing a heated fluid from the heat exchanger into at least one cavity defined within a wall defining the receiving portion.

17. The method of claim 15, wherein an axial end of the diffuser is at a first axial position while the air cycle system is in an off state, relative to a centerline axis of the annular flexible interface coupling, and wherein an axial end of the retaining flange is at the first axial position while the air cycle system is in the off state.

18. The method of claim 17, wherein the axial end of the diffuser is radially inward of the axial end of the retaining flange by at least a first radius while the air cycle system is in the off state.

* * * * *